United States Patent
Wolf et al.

[11] Patent Number: 5,749,930
[45] Date of Patent: May 12, 1998

[54] MIST COLLECTOR ARRANGEMENT FOR GAS WASHERS

[75] Inventors: Hubert Wolf, Meerbusch, Germany; Siegfried Bulang, GL Kerkrade, Netherlands; Olaf Cohrs, Blatzheim-Kerpen, Germany

[73] Assignee: Munters Euroform GMBH, Aachen, Germany

[21] Appl. No.: 658,265

[22] Filed: Jun. 5, 1996

[30] Foreign Application Priority Data

Jun. 10, 1995 [DE] Germany ............ 195 21 178.2

[51] Int. Cl.⁶ .................................................. B01D 45/08
[52] U.S. Cl. .......................... 55/242; 55/257.5; 55/462; 55/489
[58] Field of Search .................. 55/242, 257, 257.5, 55/489, 462, DIG. 14; 95/281, 221, 222, 230, 231

[56] References Cited

U.S. PATENT DOCUMENTS

| | | |
|---|---|---|
| 1,983,100 | 12/1934 | Schulz .................... 55/489 X |
| 2,011,303 | 8/1935 | Schulz .................... 55/489 |
| 2,234,385 | 3/1941 | Ryner .................... 55/257.5 X |
| 2,443,238 | 6/1948 | Glanzer .................... 55/489 X |
| 2,643,735 | 6/1953 | Logsdon .................... 55/489 X |
| 2,653,676 | 9/1953 | Breckheimer .................... 55/489 |
| 3,358,427 | 12/1967 | Bub .................... 55/489 X |
| 3,918,941 | 11/1975 | Fallon, III .................... 55/242 X |
| 4,099,938 | 7/1978 | Onnen .................... 55/242 X |
| 4,251,242 | 2/1981 | Ito .................... 55/242 |
| 5,178,654 | 1/1993 | Cowley et al. .................... 55/257.5 X |
| 5,389,127 | 2/1995 | Wurz et al. .................... 95/281 |
| 5,421,861 | 6/1995 | Gohara et al. .................... 55/257.1 X |

Primary Examiner—Richard L. Chiesa
Attorney, Agent, or Firm—Herbert Dubno

[57] ABSTRACT

Described is a mist collector arrangement for gas washers etc. having in gas flow direction a downstream and an upstream mist collector layer. The profiles of the successively arranged rows of the downstream and upstream mist collector layers are positioned oppositely with respect to one another in gas flow direction. In this manner an improved cleaning effect is obtained when periodically rinsing the mist collectors.

6 Claims, 4 Drawing Sheets

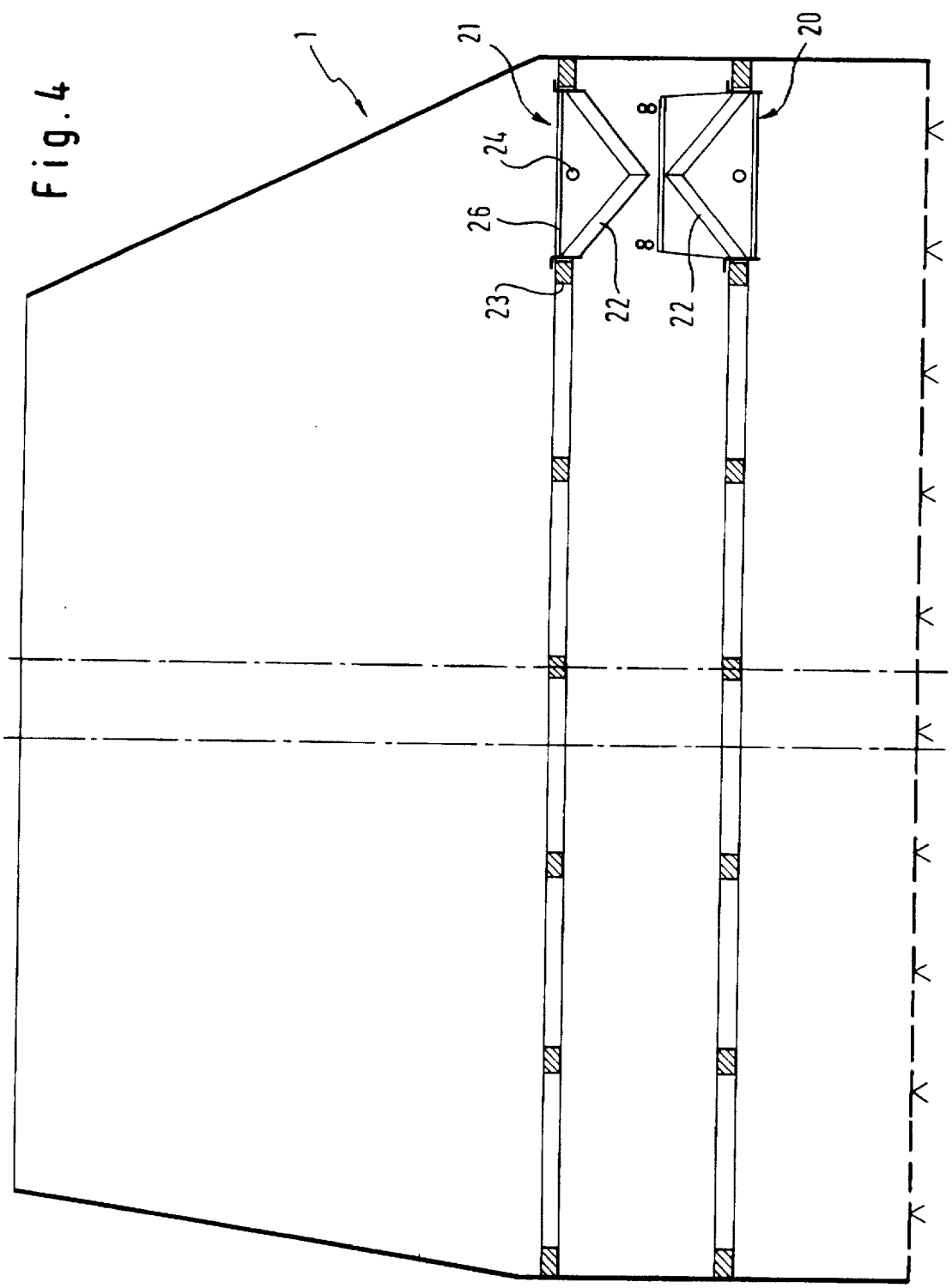

MIST COLLECTOR ARRANGEMENT FOR GAS WASHERS

The present invention is directed to a mist collector arrangement for gas washers etc. comprising, in gas flow direction, a downstream and an upstream mist collector layer which consist of at least one row of mist collector profiles arranged in the form of a V or of an inverse V, respectively, wherein a respective row of the downstream and upstream mist collector layers, in gas flow direction, are positioned one behind the other without mutual lateral offset, and a rinsing means for the periodical rinsing of the flow-on and flow-off sides of both mist collector layers.

Normally, a mist collector is positioned behind each gas washer. The mist collector includes curved blades (sheets) positioned parallel with respect to one another and distributed over the whole cross-section of a gas channel, for instance a flue gas channel. The droplets present in the gas or separated at the blades flow down the blades which have the effect of rebounding surfaces. Such mist collectors have the problem that depositions are formed on the blades which result in clogging of the mist collectors with time.

The above-cited problem is especially acute with flue gas desulphuration plants according to which mist collectors are necessary for the separation of gypsum-loaded washing liquid. In order to maintain these mist collectors free of occlusions a periodical rinsing of the flow-on and flow-off side of the mist collector is necessary. Since a portion of the rinsing liquid of the upstream mist collector rinsing is entrained in operation, a two-layer mist collector system is necessary in order to prevent such an entrainment.

Preferably, the rinsing is realized by means of nozzles installed in the gas channel. The cleaning is carried out in intervals during which the blades are sprayed with cleaning jets of washing water discharged by the nozzles and are rinsed.

In connection with the arrangement of two mist collector layers in the head of a gas washer inclined profiles have shown an especially good cleaning aptitude. In this connection a mist collector arrangement of the above-cited kind is known (internal prior art) according to which the two mist collector layers, positioned one behind the other in gas flow direction, consist of at least one row of mist collector profiles positioned in the form of a V or of an inverse V, respectively. The profiles of both rows are positioned in the same sense, i.e. both in the form of a V or both in the form of an inverse V (roof-like).

It is the object of the invention to provide a mist collector arrangement of the above-cited kind which has especially good cleaning characteristics.

With a mist collector arrangement of the above-cited kind this object is achieved according to the invention by the feature that the profiles of the successively arranged rows of the downstream and upstream mist collector layers, are positioned oppositely with respect to one another in gas flow direction.

Whilst according to the above-cited prior art the mist collector profiles of the two layers are positioned in the same sense, in accordance with the invention an arrangement in a sense opposite with respect to one another is proposed, i.e., in gas flow direction, the tips of the two Vs either point away from one another or point towards one another. Both arrangements according to the invention have substantially improved cleaning characteristics compared with the two arrangements of the prior art.

The terms "upstream and downstream mist collector layers" used in the specification and in the patent claims refer to the position of the respective layer in gas flow direction. Since normally the gas flow direction is from below to above these terms are synonymous with the terms "lower and upper position".

Thus, according to the one solution of the invention the profiles of the downstream (upper) mist collector layer are arranged in the form of a V and the profiles of the upstream (lower) mist collector layer are arranged in the form of an inverse V. The other embodiment of the invention is characterized by the feature that the profiles of the downstream (upper) mist collector layer are arranged in the form of an inverse V and the profiles of the upstream (lower) mist collector layer are arranged in the form of a V.

The two solutions have the result of a substantially improved cleaning effect. According to the solution described at first the rinsing liquid flowing down from the downstream (upper) mist collector is collected in the middle of the same (deepest point) and, from there, arrives at the highest point of the upstream (lower) mist collector. From there the rinsing water flows along the mist collector profiles of the upstream (lower) layer to the edge zones in good uniformity and thus causes an intended simultaneously rinsing of these profiles. In other words, the rinsing water for the downstream (upper) layer also rinses the upstream (lower) layer.

A corresponding effect is realized with the solution described above secondly. Here, the rinsing water of the upper layer flows from the center to the deeper edge zones of the profiles and, from there, arrives at the edge zones of the profiles of the upstream (lower) layer which edge zones have the highest positions. Thereafter, the rinsing water flows along the profiles of the upstream (lower) layer towards the center of the same so that also in this case the profiles of the lower layer are additionally rinsed by the rinsing water of the upper layer.

According to the above-described embodiment of the prior art this effect does not result. According to the V arrangement in the same sense the rinsing water of the downstream (upper) layer is collected at the deepest point of the V and drops from there to the deepest point of the V of the lower layer positioned thereunder. Accordingly, the water does not flow along the profiles of the lower layer so that no additional cleaning effect of the lower layer is achieved. According to the embodiment of the prior art according to which the profiles of both layers are arranged in a roof-like manner the rinsing water drops from the edge zones of the upper layer to the edge zones of the lower layer so that, also in this case, the rinsing water is not conducted along the profiles of the lower layer.

Accordingly, as stated above, by the invention the cleaning effect of the system is substantially improved and has the effect of a longer service life of such systems. Furthermore, the rinsing cycle of the periodical rinsing of the upstream (lower) layer can be reduced since the rinsing water for the downstream (upper) layer largely takes over the rinsing of the upstream (lower) layer. By this, the consumption of rinsing water can be substantially reduced. The consumption of rinsing water with time is an essential economical criterion with respect to the design and the operation of such gas washers, for instance flue gas desulphuration plants, since this consumption parameter plays an important role with respect to the water consumption of such a plant.

Furthermore, with this arrangement the height of the absorber can be significantly reduced. According to the embodiment of the prior art a corresponding distance between the two mist collector layers had to be maintained in order to obtain a corresponding accessibility. By the inventive arrangement the space between the support constructions of the lower and upper mist collector layers can be significantly reduced without restricting the accessibility. That is, by the Vs arranged in the opposite sense rhombic spaces between or besides an adjacent upper and lower row result which are accessible.

Another advantage of the inventive solution according to which the profiles of the downstream (upper) mist collector layer are arranged in the form of an inverse V (roof-like) and the profiles of the upstream (lower) mist collector layer are arranged in the form a V, consists in the feature that the mist collector arrangement has to have only a single support construction since both mist collector layers can be arranged at this support construction which is positioned in the intermediate range of both layers. With this construction it can be also provided that the downstream (upper) mist collector layer is separately demountable from the support construction whereby especially good cleaning and service possibilities result since one can get admitted to the profiles in an especially comfortable manner hereby.

As already mentioned above, nozzles are provided for the cleaning or rinsing of the mist collector layers. According to the inventive embodiments these nozzles are positioned at special locations. With the embodiment according to which the tips of the Vs point towards one another, preferably two nozzles are located on the central axis at the basis of the corresponding V or inverse V. The inner sides of the V-shaped layers are cleaned with these nozzles. For cleaning the outer sides at least two nozzles are located in the plane between the adjacant layers substantially in a plane intersecting the two feet of the Vs. In this case, preferably two nozzles are provided, respectively, one for an upper row and one for a lower row.

In the embodiment of the invention according to which the tips of the Vs point away from one another two nozzles are located on the vertical central axis adjacent to one another while a respective nozzle is located in a corner of the quadrangle enclosing the rhombus.

The nozzles are mounted at corresponding support constructions which are fastened at the main support constructions (one or two).

BRIEF DESCRIPTION OF THE DRAWING

In the following the invention is discussed by means of examples. Of the drawings

FIG. 4 shows an enlarged vertical section through the head of a gas washer with two rows of mist collectors located one above the other according to the first embodiment of the invention.

DESCRIPTION OF THE PREFERRED EMBODIMENTS

Figure 1:
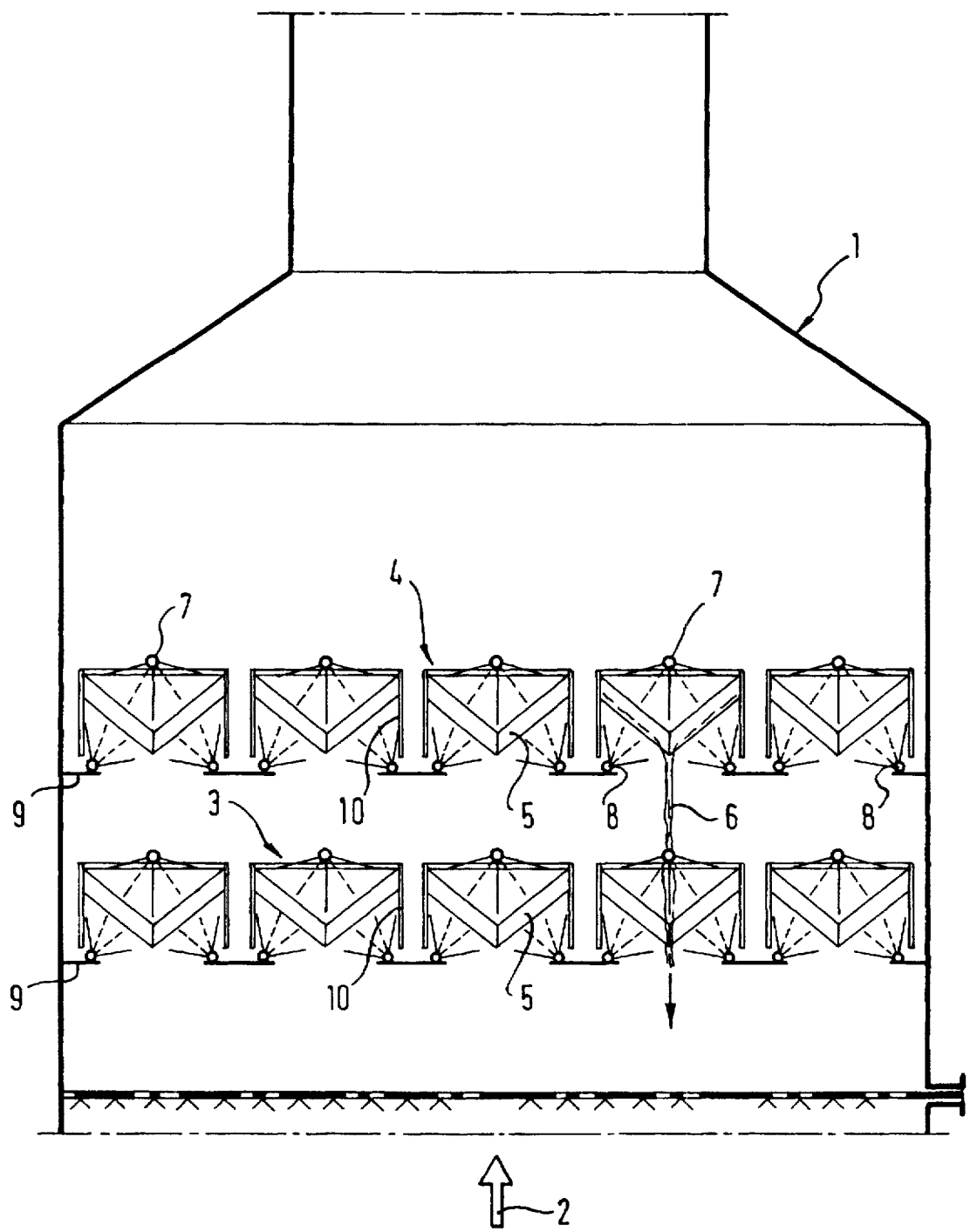
FIG. 1 shows a schematic section through the head of a gas washer with an arrangement of two layers of mist collectors wherein this arrangement is formed according to the prior art.

FIG. 1 shows schematically a vertical section of the head of a gas washer 1 which is flown through from below to above by a gas to be cleaned as shown by the arrow 2. In flow direction the gas flow passes a lower layer 3 and an upper layer 4 of mist collectors which consist of individual rows 10, respectively, which fill the complete cross-section of the head of the gas washer. Spaces are located between the individual rows to assure the accessibility of the rows.

The individual rows 10 consist of mist collector profiles 5 of known design which are located one besides the other, wherein the profiles of one row are oppositely inclined with respect to one another. Thus, according to the embodiment of the prior art of FIG. 1 adjacent mist collector profiles form a V.

The two mist collector layers 3, 4 rest on schematically shown support constructions 9. The layers are spaced from one another with a certain distance in order to enable a corresponding accessibility and thus servicing of the range between the layers.

In order to prevent an occlusion of the mist collectors a rinsing means for the periodical rinsing of the flow-on and flow-off sides of both mist collector layers is provided. This rinsing means is formed by a plurality of rinsing nozzles 7, 8 which, as shown in FIG. 1, on the one side are arranged above and centrally with respect to the Vs (as shown at 7) and on the other side below and on both sides of the Vs (as shown at 8). Not only the upper sides but also the lower sides of the mist collector profiles are sprayed with these nozzles in order to detach corresponding accumulations of dirt. One recognizes that the rinsing water of the upper mist collector layer flows down the inclined profiles inwardly towards the deepest point of the V and from there, as shown at 6, drops onto the lower layer. It arrives at the deepest point of the V of the row 10 of the lower mist collector layer located thereunder and drops downwardly from there.

Figure 2:
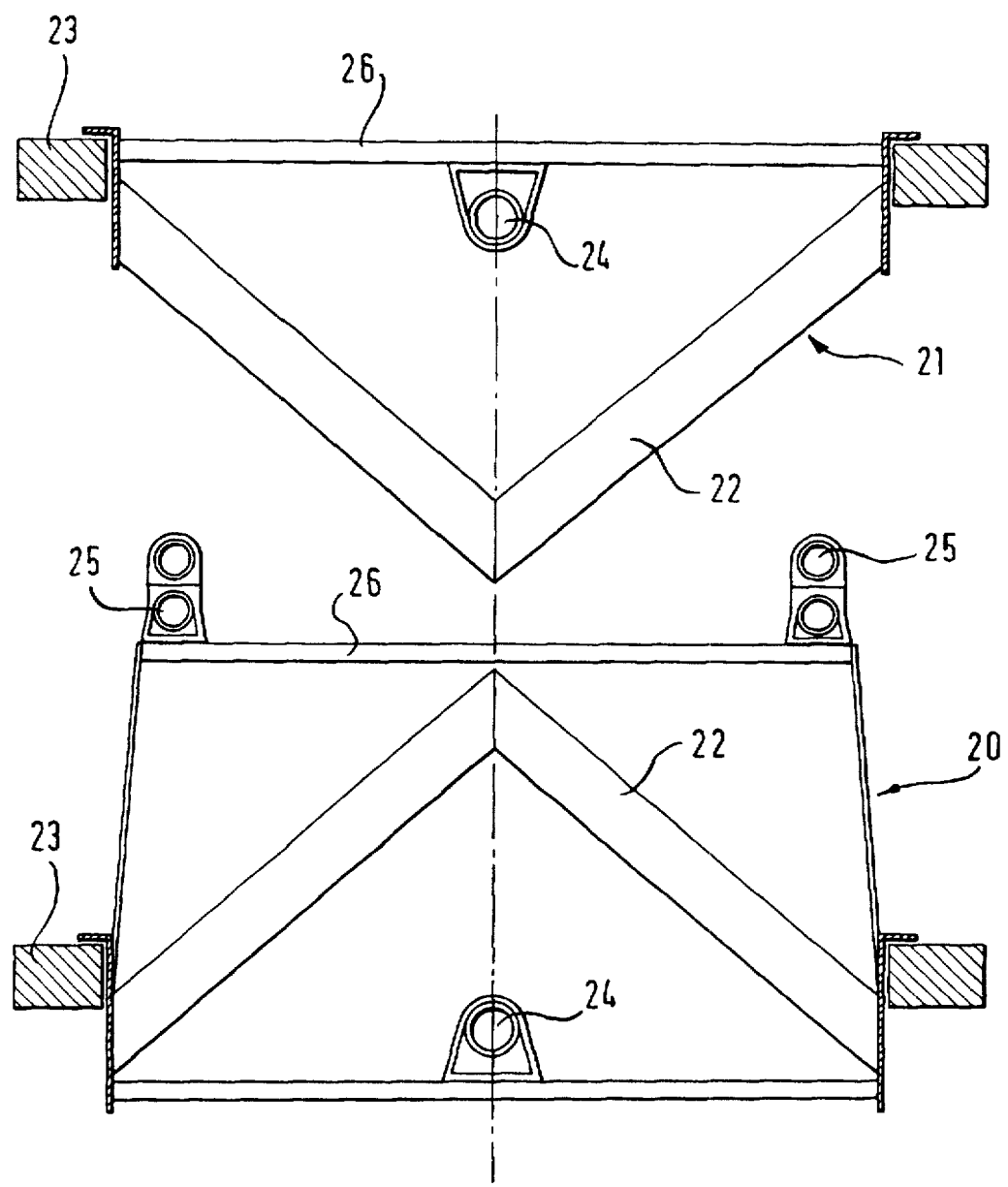
FIG. 2 shows a first embodiment of an inventive two-layer arrangement of mist collectors in a vertical section.

FIG. 2 shows an inventive mist collector arrangement in a vertical section. The arrangement also consists of a lower mist collector layer 20 and an upper mist collector layer 21 located thereabove of which only one respective row of mist collector profiles 22 is shown. In the upper layer the mist collector profiles 22 of one row are oppositely inclined with respect to one another so that a V is formed while the mist collector profiles 22 of the lower row are also oppositely inclined with respect to one another, however, in the form of an inverse V (roof-like). The individual profiles can be of known design and must not be described specificly here. They are mounted at a support construction 23, respectively, which support constructions 23 hold additional support constructions 26 for spray nozzles 24, 25. The spray nozzles 24 serve for spraying of the inner sides of the mist collector profiles while the spray nozzles 25 serve for spraying of the outer sides. The nozzles 24 are positioned on the common vertical axis of the profiles at the base of the V, respectively, while the nozzles 25 are substantially positioned within the central horizontal plane between the layers on a line connecting the feet of the Vs.

When spraying the rinsing water flows along the profiles 22 of the row of the upper layer 21 downwardly to the tip of the V and drops from there to the tip of the inverse V located thereunder. From this tip the water flows along the profiles laterally downwardly and cleans the profiles 22 of the row of the lower layer 20. Accordingly, a duplicated cleaning effect is obtained by the rinsing water of the upper layer.

Figure 3:
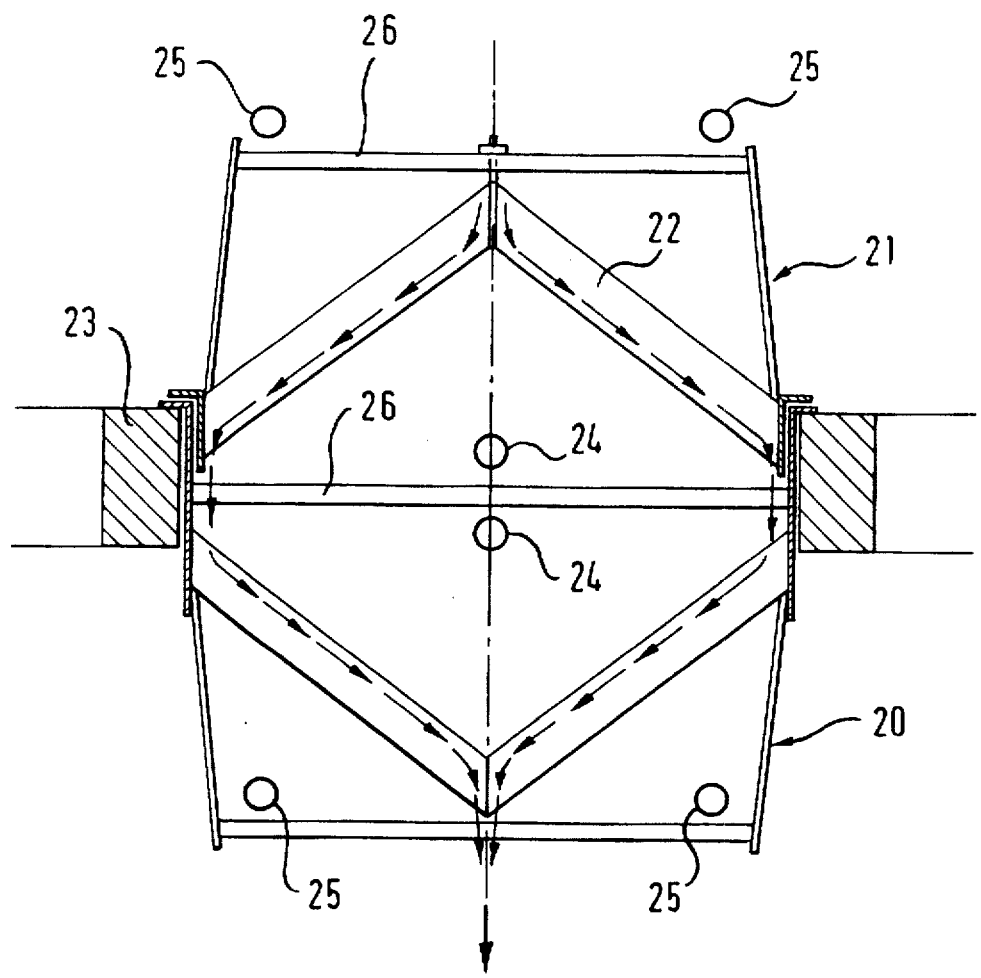
FIG. 3 shows a second embodiment of an inventive two-layer arrangement of mist collectors in a vertical section.

According to the embodiment shown in FIG. 3 the mist collector profiles 22 of the upper layer 21 are positioned in the form of an inverse V (roof-like) while the mist collector profiles 22 of the layer 20 thereunder are positioned in the form of a V. Here, the nozzle system is formed in such a manner that the nozzles 24 arranged on the central vertical axis are positioned adjacent to one another while the nozzles 25 for spraying of the outer side of the profiles are substantially positioned at the corners of a quadrangle enclosing the Vs forming a rhombus. During spraying the rinsing water flows along the profiles 22 of the row of the upper layer 21 from the highest point in the center in lateral direction into the edge portions and drops from there to the edge portions of the V located thereunder. Thereafter, it flows along the profiles 22 downwardly towards the center whereby the profiles are cleaned. From the center it drops downwardly. Accordingly, also in this case the rinsing water for the upper layer additionally cleans the mist collector profiles of the lower layer. Furthermore, one can recognize that this embodiment has a single support construction 23 which holds not only the upper layer but also the lower layer.

FIG. 4 shows the embodiment of the invention of FIG. 2 in the installed condition in the head of a gas washer 1. However, there are shown only two superposed rows of the upper and lower mist collector layers 21 and 20. With this embodiment the total height is substantially smaller than that of the embodiment of the prior art according to FIG. 1 since only a small intermediate space between the two rows has to be maintained.

We claim:

1. A mist collector arrangement for gas washers, comprising, in gas flow direction, a downstream and an upstream mist collector layer consisting of at least one row of mist collector profiles positioned in the form of a V or of an inverse V, respectively, wherein a respective row of the downstream and upstream mist collector layers are arranged one behind the other in gas flow direction without mutual lateral offset, and a rinsing means for the periodical rinsing of the flow-on and flow-off sides of both mist collector layers, wherein the profiles of the successively arranged rows of the downstream and upstream mist collector layers are oppositely arranged with respect to one another in gas flow direction.

2. The mist collector arrangement according to claim 1, wherein the profiles of the downstream mist collector layer are arranged in the form of a V and the profiles of the upstream mist collector layer are arranged in the form of an inverse V.

3. The mist collector arrangement according to claim 1, wherein the profiles of the downstream mist collector layer are arranged in the form of an inverse V and the profiles of the upstream mist collector layer are arranged in the form of a V.

4. The mist collector arrangement according to claim 3, wherein it includes a single support construction.

5. The mist collector arrangement according to claim 4, wherein the downstream mist collector layer is separately demountable from the support construction.

6. The mist collector arrangement according to claim 5 with a plurality of nozzles as spraying means, wherein a plurality of nozzles are provided at a single beam positioned at the support construction.

* * * * *